United States Patent [19]

Schlicher et al.

[11] 4,065,703

[45] Dec. 27, 1977

[54] PULSE EXCITATION TORQUE AMPLIFIER

[75] Inventors: David W. Schlicher, Minneapolis; Liboslav Fabian, Brooklyn Park, both of Minn.

[73] Assignee: Electric Machinery Mfg. Company, Minneapolis, Minn.

[21] Appl. No.: 743,695

[22] Filed: Nov. 22, 1976

[51] Int. Cl.² ............................................. H02P 1/46
[52] U.S. Cl. ................................................. 318/176
[58] Field of Search ............... 318/176, 175, 174, 190, 318/178, 177, 179, 227, 230, 231

[56] References Cited

U.S. PATENT DOCUMENTS

| | | | |
|---|---|---|---|
| 3,588,645 | 6/1971 | Gilmore | 318/176 |
| 4,012,679 | 3/1977 | Matsuda et al. | 318/174 |

Primary Examiner—Herman Hohauser
Attorney, Agent, or Firm—Merchant, Gould, Smith, Edell, Welter & Schmidt

[57] ABSTRACT

A starting control system for synchronous motors having circuits for detecting motor speed, the zero crossings of the current induced in the field windings, and the motor load angle. A circuit responsive to the detected motor speed, zero crossings and load angle triggers the DC excitation of the field at the zero crossings upon reaching a predetermined rotor speed and terminates the DC excitation at predetermined load angles. The pulsed DC excitation provides a torque that pulls the rotor into synchronism within several rotor slip cycles. In one embodiment the pulsed DC excitation is applied on both positive and negative half-cycles of the induced field current waveform.

16 Claims, 4 Drawing Figures

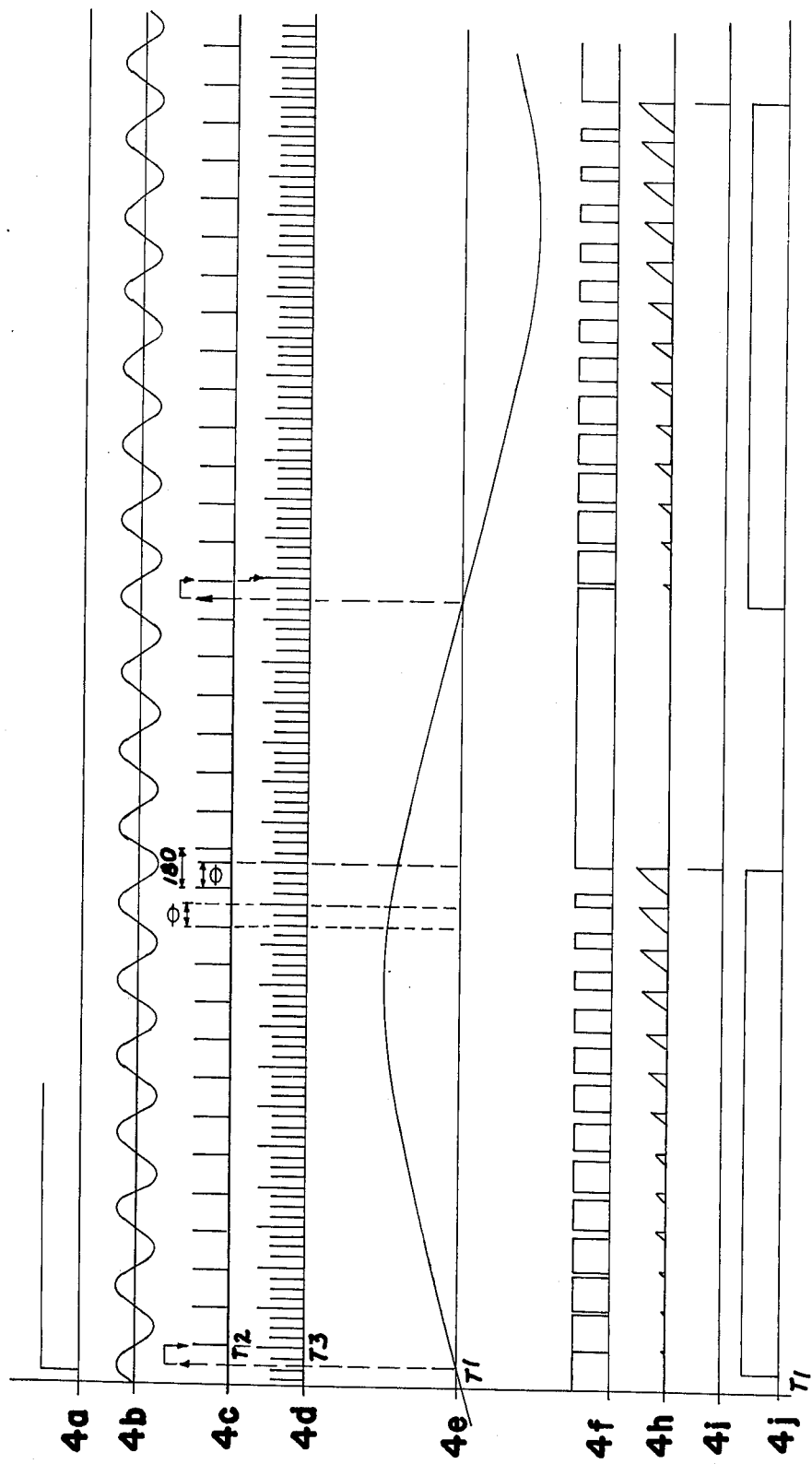

PULSE EXCITATION TORQUE AMPLIFIER

BACKGROUND OF THE INVENTION

The present invention relates to a starting control circuit for synchronous motors and, in particular, to a circuit for controlling the application of a DC excitation to the field windings of a synchronous motor to pull the rotor into step with the stator rotating magnetic field.

A synchronous motor includes a field winding which is energized by direct current to magnetize the field poles. In addition to the field winding the rotor also has an amortisseur winding which develops the rotor start-up torque. More particularly, the stator winding is energized by a polyphase power supply to develop a rotating magnetic field. The flux developed by this rotating magnetic field induces voltage and current in the amortisseur winding. The interaction between the generated current and rotating magnetic field develops a starting torque tending to turn the rotor in the same direction as the rotating magnetic field.

An alternating current is also induced in the field winding and is shorted through a field discharge resistor. The induced field current initially has a frequency corresponding to the frequency of the stator supply, and the frequency decreases as the motor approaches synchronous speed. The DC excitation is applied to the field winding as the rotor approaches synchronous speed to pull the rotor into synchronism with the rotating stator magnetic field with minimum rotor slip.

In the prior art, the motor field winding was excited with constant DC current at speeds greater than ninety percent of the motor synchronous speed. If the rotor was not pulled into synchronism upon the application of the constant DC excitation the rotor would decelerate. In applications involving high inertia loads the necessary pull-in torque is great if the motor is to be synchronized by the application of a constant DC excitation. Thus to generate such high torque, oversized machines were necessary.

The present invention solves this problem associated with the prior art synchronous motor controls in that it provides a pulsed DC excitation of the field windings as the induced field current passes through zero followed by removal of the DC excitation at some motor load angle prior to the next subsequent zero crossing of the induced field current. The DC excitation is applied in a polarity supporting the induced field current generating a torque of conventional magnitude which is effective over several cycles of rotor slip in the range of 95–100 percent of synchronous speed. By allowing for synchronism to be achieved over several slip cycles the necessity inherent in the prior art systems of accelerating the load from the point at which DC excitation is applied to 100 percent synchronous speed without slipping a pole is eliminated. Thus large magnitude synchronizing torque is unnecessary and oversized machines are not required.

SUMMARY OF THE INVENTION

The present invention is a starting control circuit for synchronous motors and includes a circuit for detecting the motor speed and generating a signal when the speed exceeds a predetermined value. The present invention also includes circuits for detecting the zero crossings of the induced field current and for determining the load angle of the motor and generating signals representative of the zero crossings and load angle. A circuit responsive to the motor speed signal, zero crossing signal and load angle signal triggers the DC excitation of the field winding at the zero crossings when the speed exceeds the predetermined value, and removes the DC excitation at predetermined load angles.

In one embodiment, a pulse train is generated as representative of the stator frequency. A second pulse train is generated in response to rotation of the rotor and has a frequency of n times the frequency of the stator pulses. The pulse train corresponding to rotor frequency is then applied to a divide-by-n counter which provides an output pulse train with a frequency corresponding to the stator pulse train. The two pulse trains are fed to a flip-flop having an output signal with pulses of a width representative of the phase angle of the induced field current which in turn is a measure of the motor load angle. The signal representative of the phase angle is then applied to a circuit which generates an off signal that is applied to the DC excitation at a predetermined phase angle.

In one embodiment, an alternating DC excitation is applied on both positive and negative halfcycles of the induced field current. In an alternative embodiment, a single polarity DC pulse is applied to the field winding only during positive half-cycles of the induced field current.

The circuit for detecting zero crossings of the induced field current generates an output signal having a pulse at each zero crossing. The DC excitation is applied at each such zero crossing and removed at the predetermined load angle of the motor. The predetermined load angle may be selected between 0°–180° of the induced field current waveform.

The present invention thus provides a control circuit for bringing a rotor into synchronism with the rotating stator-induced magnetic field utilizing conventional pull-in torque over several rotor slip cycles. These and other advantages of our invention will become apparent with reference to the drawings, description of the preferred embodiment, and claims.

BRIEF DESCRIPTION OF THE DRAWINGS

FIG. 4 is a waveform diagram illustrating the operation of the pulse excitation torque amplifier circuit embodying the present invention.

DESCRIPTION OF THE PREFERRED EMBODIMENT

Figure 1:
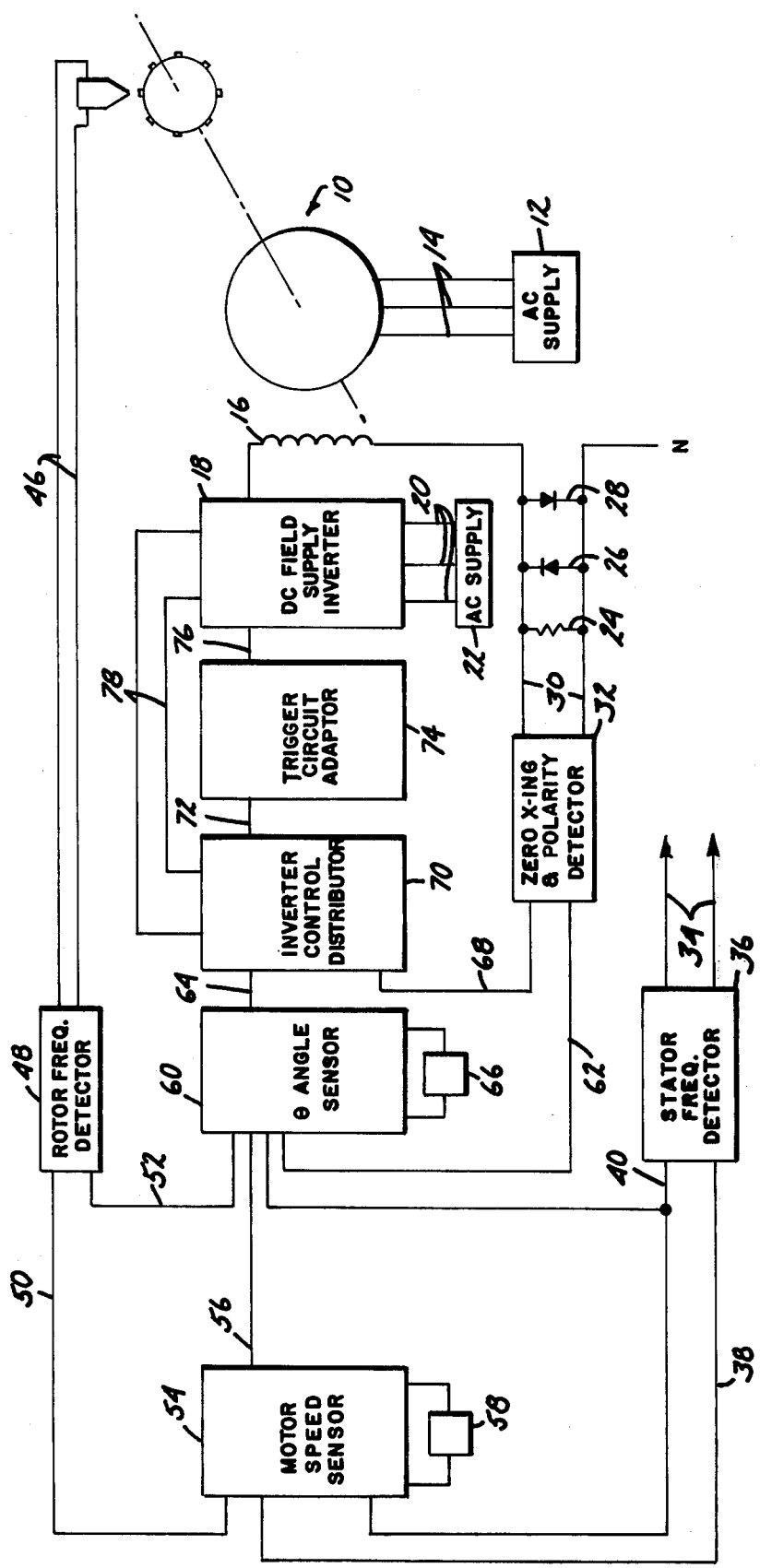
FIG. 1 is a block diagram schematic of the synchronous motor pulse excitation torque amplifier circuit embodying the present invention.

Referring to the drawing, wherein like numerals represent like parts throughout the several views, there is shown schematically in FIG. 1 a synchronous motor 10 incorporating the field excitation control circuit of the present invention. The synchronous motor stator is powered by an AC supply 12 along conductors 14. The synchronous motor field 16 is excited by the application of alternating DC power from a field supply inverter 18. Power is applied to inverter 18 along lines 20 from an AC source 22. Field 16 is in series with a resistor 24 and parallel connected diodes 26 and 28. The voltage waveform appearing on lines 30 is representative of the induced field current. Lines 30 are connected to a rotor current zero crossing and polarity detector circuit 32.

An AC signal from the synchronous motor stator is applied along lines 34 to a stator frequency detector 36. Stator frequency detector 36 generates on line 38 a signal indicating that the stator is "on" or energized and a pulse train having a pulse at every 180 degrees of the stator since waveform on line 40. A magnetic pickup 42 is magnetically coupled to a gear 44 on the synchronous motor rotor and generates a rotor frequency signal on line 46. Lines 46 are connected to a rotor frequency detector 48 which generates a signal on line 50 and 52 representative of rotor speed. The signal on line 50 is a rotor pulse train which is applied to a motor speed sensor 54 along with the stator "on" signal on line 38 and the stator frequency pulse train on line 40. Motor speed sensor 54 detects when the motor speed exceeds a predetermined percentage of synchronous speed and then generates an output signal on line 56. The predetermined percentage of synchronous speed may be adjusted by a speed adjusting device 58. The signal on line 52 is a rotor pulse waveform that, along with the speed "on" signal on line 56 and the stator pulse signal on line 40, is applied to a rotor waveform phase angle sensor 60. Additionally, rotor zero crossing and polarity detector 32 applies along line 62 a signal representative of zero crossings of the induced field current to load angle sensor 60. Load angle sensor 60 generates on line 64 a DC field excitation on-off signal. DC excitation is turned on at induced field current zero crossings and turned off at a predetermined phase angle. A phase angle adjusting device 66 provides a means for varying the phase angle at which the excitation to the field windings is removed. Induced field current zero crossing and polarity detector 32 also provides a signal on line 68 representative of the proper DC polarity which must be applied. Thus, in the preferred embodiment, when the induced field current is on the positive half-cycle a positive DC pulse is applied, and conversely when the induced field current is on the negative half-cycle a negative DC pulse is applied. Alternatively, the field windings may be excited only on positive half-cycles eliminating the necessity of a polarity detector.

The DC excitation on-off signal on line 64 and polarity signal on line 68 are fed to an inverter control distributor circuit 70. Inverter control distributor circuit 70 applies a positive-on, negative-on, or off signal along line 72 to a trigger circuit adapter 74. The DC excitation signal is fed along line 76 to the alternating DC field supply inverter 18. Safety feedback lines 78 connect alternating DC field supply inverter 18 and inverter control distributor 70 to provide feedback control signals.

Figure 3:
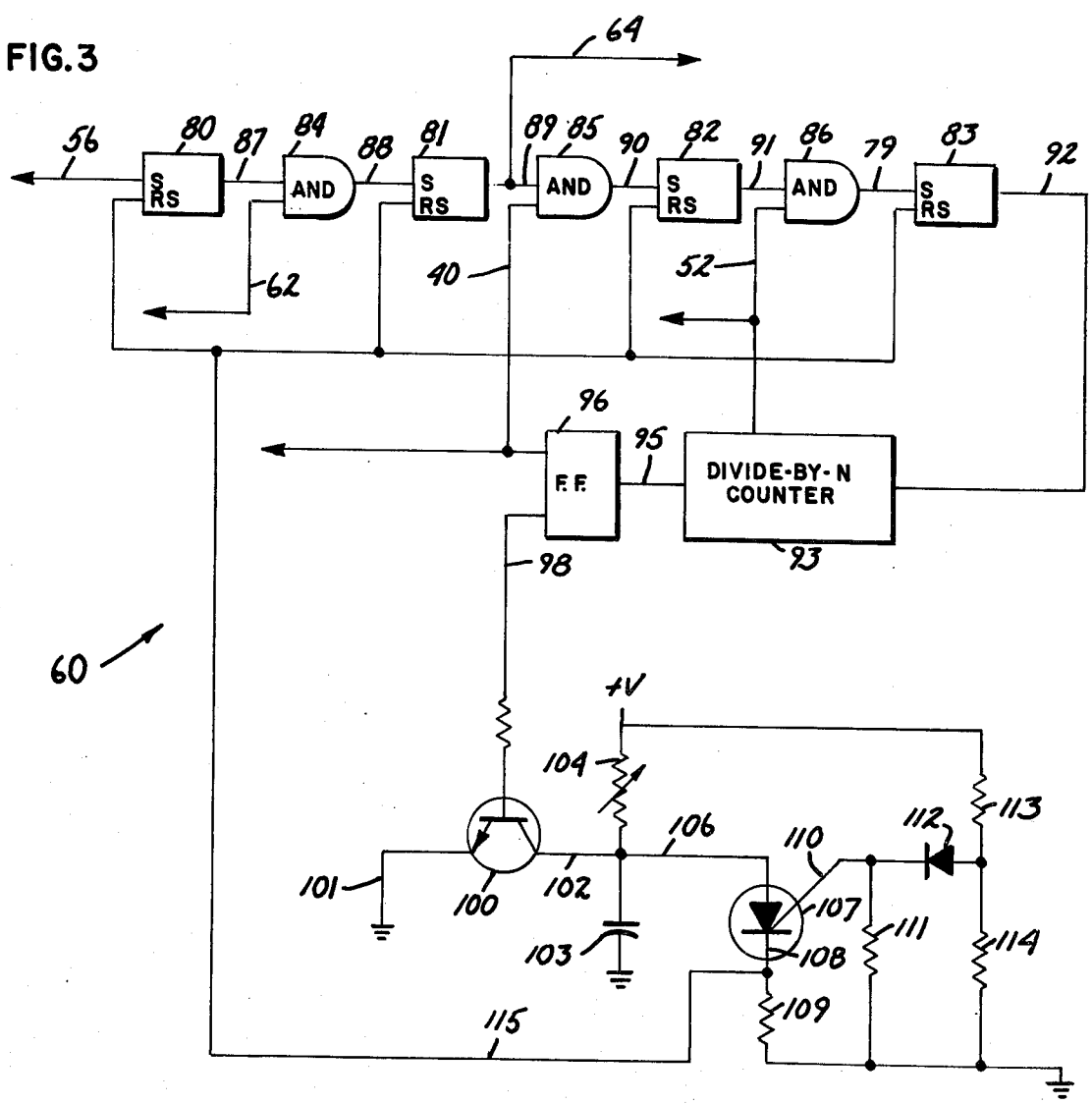
FIG. 3 is a detailed schematic of the load angle sensor circuit shown in block diagram form in FIG. 1.

Referring to FIG. 3, the preferred embodiment of the present invention will be described and the operation thereof discussed in greater detail than that depicted in the schematic shown in FIG. 1. FIG. 3 illustrates the present invention as embodied in the load angle sensor circuit 60. The angle sensor includes a plurality of set and reset flip-flops 80, 81, 82 and 83 having set and reset inputs s and rs, respectively. Also included are "AND" logic devices 84, 85, and 86. One input device 84 is connected by line 87 to the output of flip-flop 80. The complementary input of device 84 is connected by line 62 to the rotor induced current zero crossing detector 32. One input of device 85 is connected by line 89 to flip-flop 81. The complementary input of device 85 is connected by line 40 to the stator frequency detector 36. Logic device 86 has an input connected to the output of flip-flop 82 via line 91, while the complementary input of device 86 is connected by line 52 to the rotor frequency detector 48. Additionally, the output of flip-flop 81 is connected to line 64 and the signal appearing at the output of flip-flop 81 is the "on" and "off" signal for the DC field excitation and is applied to the inverter control distributor 70. The output of flip-flop 83 is connected by line 92 to a divide-by-n counter 93. A second input is supplied to counter 93 along line 52 which is connected to rotor frequency detector 48. The output of counter 93 is applied along line 95 to a flip-flop device 96 having a second input connected by line 40 to the stator frequency detector 36. The output of flip-flop 96 is seen on line 98 which leads through a resistor 99 to the base of a transistor 100.

The emitter of transistor 100 is grounded by line 101 while the collector is connected by line 102 to one terminal of a capacitor 103 having its second terminal connected to ground. Line 102 is also connected through a variable resistor 104 to a source of biasing potential V+. The transistor collector is also connected by line 106 to the anode terminal of a programmable unijunction transistor 107. Unijunction transistor 107 has a cathode terminal 108 connected through resistor 109 to ground. Gate terminal 110 is also connected to ground through a resistor 111 and to a source of biasing potential through a diode 112 and voltage divider consisting of resistors 113 and 114. Cathode 108 of unijunction transistor 107 is also connected by line 115 to the reset inputs of flip-flops 80, 81, 82 and 83.

The operation of the torque amplification control circuit will be described with reference to the waveforms shown in FIG. 4. To start synchronous motor 10, polyphase AC power is supplied to the motor stator windings (not shown) along lines 14 by power supply 12. Rotor field winding 16 is normally short circuited during motor start-up and acceleration through a field discharge resistor (not shown). A conventional synchronous motor has amortisseur windings associated with the rotor. The application of the polyphase power to the stator winding results in the development of a rotating magnetic field which cuts across the amortisseur windings generating voltage and current at rotor slip frequency. The interaction between the induced current and the rotating magnetic field develops a torque which tends to turn the rotor in the same direction as the rotating magnetic field. The current induced in the field discharge resistor generates a waveform which is illustrated in FIG. 4(e). The signal represented by the waveform 4(e) is applied on lines 30 to the zero crossing and polarity detector 32. The stator voltage waveform which is shown in FIG. 4(b) is applied on lines 34 to the stator frequency detector 36. The output of the stator frequency detector is the pulse waveform shown in FIG. 4(c). The pulse waveform is supplied to motor speed sensor 54 and flip-flop 96 along line 40. A stator "on" signal is also generated by stator frequency detector 36 and applied along line 38 to motor speed sensor 54.

Magnetic pickup 42 responds to the rotation of gear 44 which is secured to the motor rotor to generate a signal on line 46 representative of rotor speed. One output of the rotor frequency detector 48 is a pulse train as shown in FIG. 4(d) which is fed to motor speed sensor 54 along line 50. Rotor frequency detector 48 is designed to generate a pulse train having a frequency which is n times the frequency of the stator pulse train shown in FIG. 4(c). When the motor speed reaches a predetermined relationship with respect to synchronous speed, typically 95 percent of synchronous speed, motor speed sensor 54 generates the signal shown in FIG. 4(a) which is applied on line 56 to the set input of flip-flop 80. Flip-flop 80 thus applies an "enable" or "one" signal to AND gate 84. When a pulse indicating a zero crossing of the induced field current appears on line 62, AND gate 84 generates an output applied to set input of flip-flop 81 along line 88. Flip-flop 81 provides an "enable" or "one" signal along line 89 to AND gate 85. Additionally, the "enable" signal from flip-flop 81 appears on line 64 where it is fed to inverter control distributor 70 as the "on" signal to alternating DC field supply inverter 18. DC excitation is thus applied to the field windings at time $T_1$ as shown in the waveform illustrated in FIG. 4(j).

The next pulse from the stator frequency detector 36 at time $T_2$ as shown in waveform illustrated in FIG. 4(c) is applied along line 40 to AND gate 85. AND gate 85 then produces a signal on line 90 which is applied to set input of flip-flop 82. Flip-flop 82 therefore provides an output on line 91 to AND gate 86. The next pulse from the rotor frequency detector 48 is shown at time $T_3$ in the waveform shown in FIG. 4(d) and is applied on line 52 to AND gate 86. It should be noted that the rotor pulse signal is n times the stator signal so that the time $T_3$ is as close as possible to time $T_1$ providing for the accurate measurement of the phase angle. An "enable" signal is generated at the output of AND gate 86 and applied along line 79 to set input of flip-flop 83. Flip-flop 83 produces a signal on line 92 which enables a divide-by-n counter 93. Counter 93 begins to divide-by-n the rotor frequency pulse waveform applied to counter 93 along line 52. Thus the output of counter 93 is a rotor pulse waveform having the same frequency as the stator pulse waveform generated by the stator frequency detector 36. The output of counter 93 is applied through line 95 to the reset input of flip-flop device 96. Flip-flop device 96 receives a second input of the stator pulses via line 40 applied to the set input of device 96.

Flip-flop 96 is set by each stator pulse and reset by each next divided-by-n rotor pulse so that the width of the output pulses from flip-flop 96 is a function of the phase angle of the induced field current waveform shown in FIG. 4(e). The output of flip-flop 96 appears on line 98 and is shown in FIG. 4(f). The phase angle is measured by the time increment between corresponding stator and rotor frequency pulses as shown by the representation of phase angle $\theta$ illustrated in FIGS. 4(c)-4(e).

Transistor 100 is normally conducting in the absence of the pulse signal on line 98 providing a discharge path for capacitor 103. Transistor 100 is therefore turned "off" by the appearance of a negative pulse applied to the transistor base along line 98 through resistor 99. During the increment of time that transistor 100 is "off", capacitor 103 begins to charge through variable resistor 104. When the voltage across capacitor 103 reaches the trigger level of unijunction transistor 107, a pulse is produced at 109 which is applied by line 115 to the reset inputs of flip-flops 80, 81, 82, and 83. When flip-flop 81 is reset a DC "off" signal appears at the output of flip-flop 81 and is fed along line 64 to inverter control distributor 70. The reset pulse waveform is illustrated in FIG. 4(i). FIG. 4 illustrates the operation of angle sensor 60 when it is designed to initiate DC field excitation at zero induced field current phase angle and extinguish the excitation at 120° of the induced field current waveform. The DC "turn-off" phase angle can be adjusted by varying resistor 104 which changes the RC time constant of the capacitor charging circuit. The "turn-off" time can be increased by adjusting the time constant to provide for more rapid charging of capacitor 103 to the trigger level. Conversely, DC excitation "turn-off" can be delayed by varying the resistance to achieve a slower charging rate.

The circuit functions similarly on the subsequent negative half-cycle of the induced field current waveform with the operation initiated again by the detection of zero induced current phase angle. On the negative half-cycle, of course, the applied DC excitation is of negative polarity as determined by zero crossing and polarity detector 32. It is understood that other circuits which detect the induced field current phase angle are within the scope of the present invention.

Figure 2:
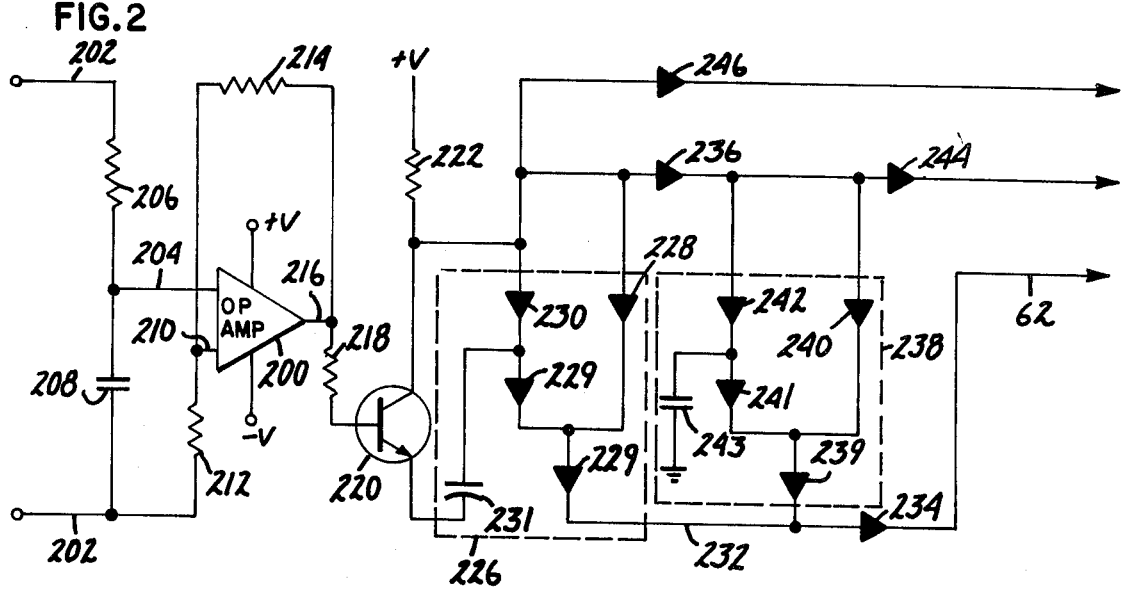
FIG. 2 is a detailed schematic of the zero crossing and polarity detector circuit illustrated in block diagram form in FIG. 1.

The zero crossing and polarity detector circuit is shown in detail in FIG. 2 for the reversible DC supply system. The circuit includes an operational amplifier 200 to which is applied on terminals 202 the voltage waveform representative of the current induced in the field discharge resistor. One input 204 of dual operational amplifier 200 is connected to an RC network which includes resistor 206 and capacitor 208. The other input 210 of operational amplifier 200 is connected to an input resistor 212 and a feedback resistor 214. The output 216 of dual operational amplifier 200 is connected through a resistor 218 to the base of a transistor 220. The emitter of transistor 220 is grounded while the collector is connected through a resistor 222 to a source of DC biasing potential. The collector of transistor 220 is also connected along line 224 to a gate network indicated generally at 226. Gate network 226 includes inverter devices 227–230 and capacitor 231. The output of gate network 226 is fed along line 232 to a gate 234.

The collector of transistor 220 is also connected through an inverter 236 to a second gate network 238 having inverter devices 239–242 and capacitor 243. The output of gate network 238 is also fed to inverter 234. As will be explained in the following paragraphs, gate networks 226 and 238 are essentially identical and perform the same function. The output from inverter 236 is also fed to an inverter 244 the output of which is a polarity square waveform which is applied to inverter control distributor 70. The collector of transistor 220 is also applied to an inverter 246 to generate a polarity square waveform which is also applied to inverter control distributor 70. The signal from inverters 246 and 244 indicate the polarity of the induced field current.

Finally, the output from gate 234 is applied to load angle sensor 60 along line 62, the output signal being a series of pulses, each pulse representing a zero crossing of the induced field current.

The operation of the zero crossing and polarity detector will now be described. The waveform applied to terminals 202 is basically that illustrated in FIG. 4(e). The output of operational amplifier 200 appearing on line 216 is a voltage square waveform with positive and negative half-cycles corresponding to the positive and negative half-cycles of the input waveform at terminals 202. The output of transistor 220 appearing at the transistor collector is a square waveform having a zero value during positive half-cycles of the output of operational amplifier 200 and a positive half-cycle corresponding to negative half-cycles of the output of the operational amplifier 200. This positive half-cycle waveform is applied to gate 226 which generates a pulse applied along line 232 corresponding to the zero crossing of the leading edge of the positive half-cycle of the induced current waveform shown in FIG. 4(e). The positive half-cycle waveform output from transistor 220 is applied to inverter 236 to generate a positive half-cycle waveform having a positive value corresponding to positive half-cycles of the output of operational amplifier 200 and a zero value during half-cycles corresponding to the negative half-cycles of the output of operational amplifier 200. The positive square waveform produced by inverter 236 is then applied to gate circuit 238 which produces an output pulse that is supplied to gate 234. The pulses generated by gate circuit 238 correspond to zero crossings at the trailing edge of the positive half-cycle of the input waveform at terminals 202. The pulse signals generated by gates 226 and 238 are thus summed to provide a signal input to inverter 234 that is a series of pulses corresponding to the zero crossings of the induced field current. As previously mentioned, the polarity square waveforms which are seen at the outputs of inverters 246 and 244 provide an indication of the polarity of each half-cycle of the voltage input applied on terminals 202.

In an alternative embodiment, wherein the field is excited only on positive half-cycles of the induced field current waveform, one of the gate circuits 226 or 238 are simply eliminated from the zero crossing and polarity detector circuit. Thus, only one pulse signal corresponding to zero crossing of the trailing edge of the positive half-cycle of the induced field current waveform would be applied to inverter 234. Additionally, in a single polarity system, inverters 246 and 244, along with inverter 236, can be eliminated since it is not necessary to determine the polarity of the induced field current and half-cycles. In the single polarity system, the DC voltage would be applied to the field only during half-cycle when the induced field current is positive. The remainder of the circuit in the single polarity system, to include the load angle detecting circuit, would be identical to the circuit of the reversible DC system.

It can be seen, therefore, that the present invention is a motor control circuit which provides a DC excitation to the rotor field windings when the motor reaches a predetermined speed and at zero crossings of the current induced in the field windings. Additionally, the DC excitation is turned off at a predetermined adjustable load angle measured by the phase angle of the induced field current. The rotor is thus pulled into synchronism by the application of conventional synchronizing torque within several pole slips of the rotor.

What we claim is:

1. A torque amplifier control circuit for pulling a synchronous motor rotor having a field winding with the stator rotating field comprising:
   means for detecting motor speed and generating a first signal representative thereof;
   means for detecting the zero crossings of the induced field current waveform and generating a second signal representative of said zero crossings;
   means for determining the load angle of the motor and generating a third signal representative thereof; and
   means responsive to said first, second and third signals for applying a DC voltage to said field winding at said zero crossings when said motor speed exceeds a predetermined value, and removing said DC voltage at predetermined load angles whereby said motor is pulled into synchronism within several rotor slip cycles.

2. A torque amplification control circuit in accordance with claim 1 further comprising:
   means for detecting stator frequency and generating a pulse signal representative of said stator frequency; and
   means for detecting rotor frequency and generating a pulse signal representative of said rotor frequency.

3. A torque amplification control circuit in accordance with claim 2 wherein said means for determining the load angle of the motor further comprises:
   means for comparing said pulse signal representative of said stator frequency and said pulse signal representative of said rotor frequency and generating an output pulse having a width repesentative of the load angle.

4. A torque amplification control circuit in accordance with claim 3 wherein said means responsive to said first, second and third signals further comprises:
   means responsive to said output pulse of said comparing means for removing said DC field excitation when a predetermined load angle is detected.

5. A torque amplification control circuit in accordance with claim 4 wherein said means for detecting rotor frequency generates a pulse signal having a frequency n times the frequency of said stator pulse signal.

6. A torque amplification control circuit in accordance with claim 5 further comprising a divide-by-n counter connected between said means for detecting rotor frequency and said comparing means to divide the pulse signal generated by said rotor frequency detector down to said stator pulse signal frequency.

7. A torque amplification control circuit in accordance with claim 6 wherein said means responsive to said output pulse of said comparing means further comprises:
   a transistor having a base connected to the output of said comparing means, a collector, and a grounded emitter, said transistor being normally conductive and wherein said transistor is turned off by said output pulse of said comparing means;
   a capacitor having a first terminal connected to said collector and a second grounded terminal, said capacitor normally discharged through said normally conductive transistor whereby the voltage on said capacitor increases when said transistor is turned off during the time interval determined by said pulse from said comparing means;
   a resistor connected between said first terminal of said capacitor and a DC power source; and
   switch means connected to said first terminal of said capacitor for generating an output pulse when the voltage on said capacitor reaches a predetermined trigger level.

8. A torque amplification control circuit in accordance with claim 7 wherein said switch means is a programmable unijunction transistor.

9. A torque amplification control circuit for pulling a synchronous motor rotor having a field winding into step with the stator rotating field comprising:
   means for detecting motor speed and generating a first signal representative thereof;
   means for detecting the zero crossings of the induced field current waveform and generating a second signal representative of said zero crossings;

means for determining the load angle of the motor and generating a third signal representative thereof;

means for detecting the polarity of said induced field current and generating a fourth signal representative thereof;

means responsive to said first, second, third, and fourth signals for applying a DC voltage to said field winding at said zero crossings when said motor speed exceeds a predetermined value and removing said DC voltage at predetermined load angles, said DC voltage being of the same polarity as the induced field current.

10. A torque amplification control circuit in accordance with claim 9 further comprising:

means for detecting stator frequency and generating a pulse signal representative of said stator frequency; and means for detecting rotor frequency and generating a pulse signal representative of said rotor frequency.

11. A torque amplification control circuit in accordance with claim 9 wherein said means for determining load angle of the further comprises:

means for comparing said pulse signal representative of said stator frequency and said pulse signal representative of said rotor frequency and generating an output pulse having a width representative of the load angle.

12. A torque amplification control circuit in accordance with claim 11 wherein said means responsive to said first, second, and fourth signals further comprises:

means responsive to said output pulse of said comparing means to remove said DC excitation from said field when a predetermined load angle is detected.

13. A torque amplification control circuit in accordance with claim 12 wherein said means for detecting rotor frequency generates a pulse signal having a frequency of n times the frequency of said stator pulse signal.

14. A torque amplification control circuit in accordance with claim 13 further comprising a divide-by-n counter connected between said rotor frequency detecting means and said comparing means to divide the rotor pulse signal down to stator pulse frequency.

15. A torque amplification control circuit in accordance with claim 14 wherein said means responsive to said output pulse of said comparing means further comprises:

a transistor having a base connected to the output of said comparing means, a collector, and a grounded emitter, said transistor being normally conductive whereby said transistor is turned off by said output pulse of said comparing means;

a capacitor having a first terminal connected to said collector and a second grounded terminal, said capacitor normally discharged through said normally conductive transistor whereby said capacitor charges during the time interval that said transistor is turned off;

a resistor connected between said first terminal of said capacitor and a DC power source; and switch means connected to said first terminal of said capacitor for generating an output pulse when the voltage on said capacitor reaches a predetermined trigger level.

16. A torque amplification control circuit in accordance with claim 15 wherein said switch means is a programmable unijunction transistor.

* * * * *